United States Patent Office 2,921,314
Patented Jan. 19, 1960

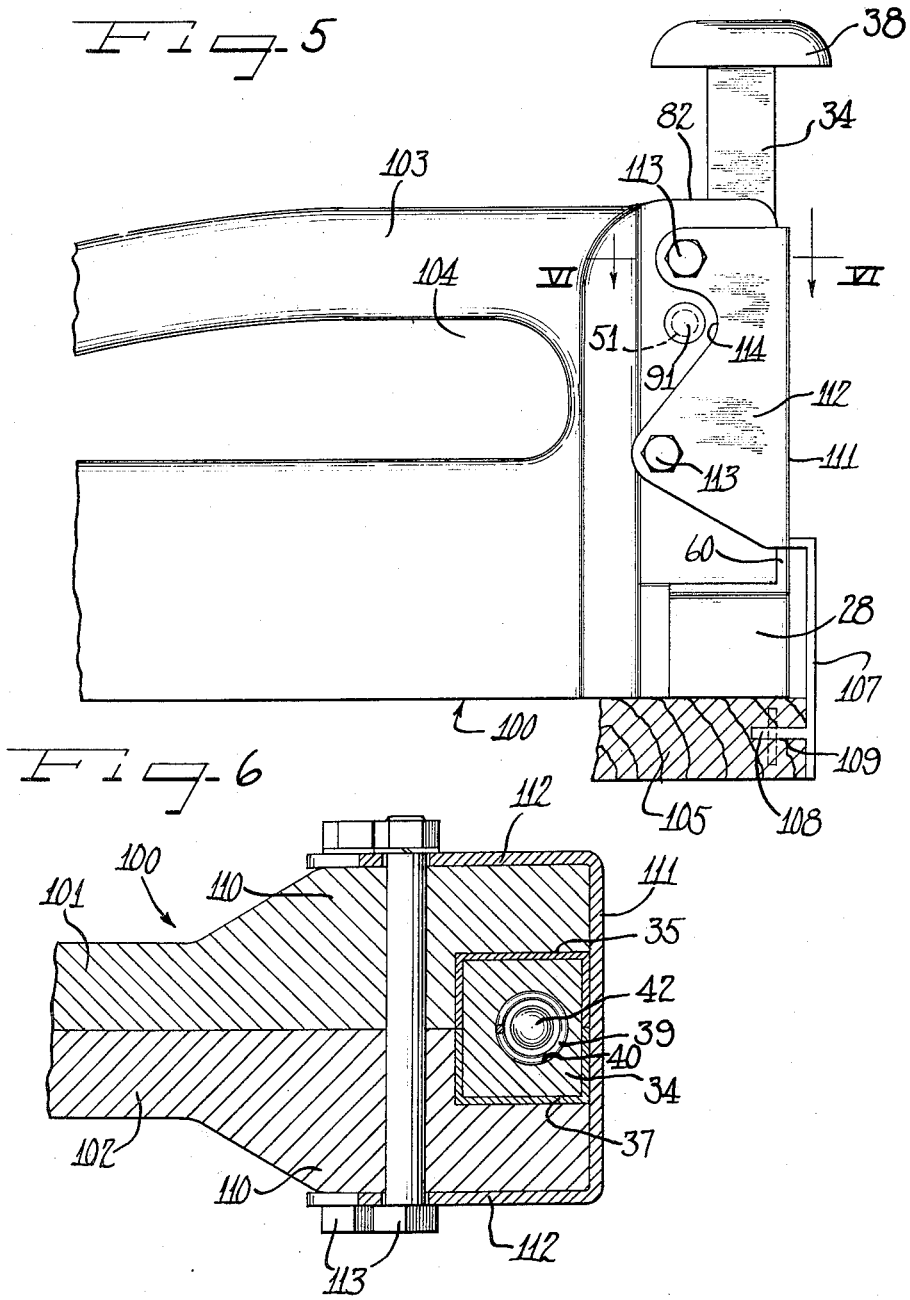

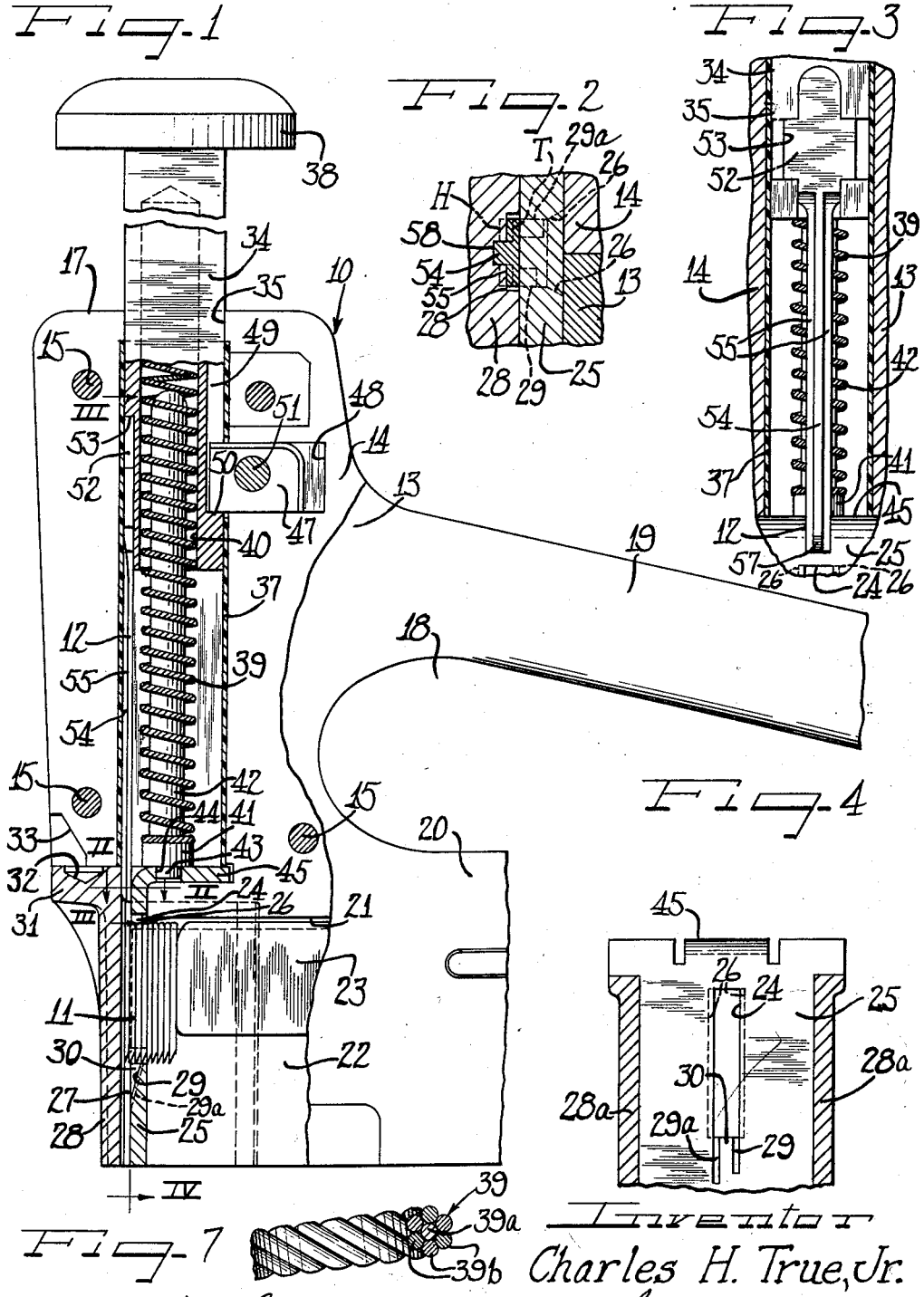

2,921,314

STAPLE OR LIKE FASTENER DRIVING MACHINE

Charles H. True, Jr., Kenilworth, Ill., assignor to Spotnails, Inc., Evanston, Ill., a corporation of Illinois Application January 4, 1956, Serial No. 557,392

6 Claims. (Cl. 1—49)

The present invention relates to improvements in fastener driving machines and more particularly concerns such machines which are manually operable and are portable for various industrial and trade uses. In this connection it may be mentioned that the features of the present invention are primarily not applicable to the small desk or office type of stapling machines, but to machines adapted for driving the heavy gauge staples, pin-like fasteners and the like especially adapted for securing wooden members together, for fastening wallboard and similar covering materials in place and for securing together other forms and types of fairly heavy penetrable assemblies permanently.

One of the important problems that has been encountered in driving machines of this type has been in the breakage of the relatively long and thin driving blades that must be employed. This, in spite of the use of high grade steel in the manufacture of the blades, and the use of best available hardening techniques.

Another problem that has been encountered in connection with such blades has been that for each different size of fasteners such as staples, particularly with respect to different sizes as to staple gauge it has heretofore been necessary to provide separate blades to match the different gauges. That is, the thickness of the blades or the gauge of the material from which the blades have been made has had to be chosen to match the gauge or thickness of the fasteners.

It has also been a problem to drive fasteners close into the corners of angularly joined members defining therebetween a re-entrant corner.

It is accordingly an important object of the present invention to provide improvements in fastener driving machines for overcoming the foregoing and other problems and deficiencies that have heretofore been encountered.

Another object of the present invention is to provide an improved fastener driving blade structure that is highly resistant to breakage in service under the severest operational usage.

A further object of the invention is to provide an improved fastener driving machine having a novel cooperation of the driving blade and guide structure therefor.

Still another object of the invention is to provide an improved fastener driving blade which may be made to a standard size and is readily adaptable for efficient use in driving fasteners of a variety of gauges.

It is also an object of the invention to provide an improved fastener driving assembly.

A yet further object of the invention is to provide novel means in a manually operable fastener driving machine to adapt the machine for driving fasteners closely within re-entrant corners formed by members to be secured together or by members with one of which another member is to be secured.

A still further object is to provide an improved return spring structure for the driving members of fastener driving machines.

An additional object of the invention is to provide an improved staple leg guiding ramp structure at the driving station in a stapling machine.

Other objects, features and advantages of the present invention will be readily apparent from the following detailed description of certain preferred embodiments thereof taken in conjunction with the accompanying drawings, in which:

Figure 1 is a fragmentary vertical elevational sectional view of the front or driving end portion of a fastener driving machine embodying features of the invention;

Figure 2 is a fragmentary enlarged sectional detail view taken substantially on the line II—II of Figure 1;

Figure 3 is a fragmentary vertical sectional elevational view taken substantially on the line III—III of Figure 1;

Figure 4 is a fragmentary vertical sectional view taken substantially in the plane of line IV of Fig. 1 to show the front face of the rear back-up plate that provides part of the driver guideway and fastener driveway;

Figure 5 is a fragmentary side elevational view of a modification of the machine showing the same in an operative position in relation to work to be operated on;

Figure 6 is an enlarged fragmentary sectional detail view taken substantially on the line V—V of Fig. 4; and Figure 7 is an enlarged fragmentary sectional elevational view of a coil of the driver return spring of the machine.

Having reference to Figs. 1, 2 and 3, a fastener driving machine 10 is shown adapted for driving various types of fasteners including pins and nails but herein more especially adapted to support and drive fasteners of the staple variety including individual staples 11 (Fig. 1) put up for ease in handling into "stick" form, that is a convenient plurality of the staples attached adhesively in side by side relation. Such staples are of the industrial variety or for trade use and are of substantial length and gauge or weight. The staples 11 shown are of the narrow crown type and long leg type, being in the illustrated instance of approximately 1⅝" in length, about ¼" in width and selectively from 12 to 20 gauge in thickness or wire size which will be governed by the type of work with which the staples are to be used.

The machine 10 is constructed and arranged to support a substantial supply of the staples 11 and feed the same into position under a driving blade 12 for driving from the machine into the work. In a desirable form the machine includes a body structure that may be constructed as a pair of complementary left and right hand body plates 13 and 14 which are suitably secured together as by means of screws or bolts 15 into face-to-face relation and are provided at the interface thereof with suitable cooperatively related cavities for housing the operating mechanisms of the machine. At its front end portion the body 10 is provided with a driving head structure 17 while rearwardly from the body head structure is provided a hand hole 18 defined at its upper side by a handle portion 19. At the lower side of the hand hole is provided a magazine section 20 having therein a longitudinal magazine chamber 21 within which is mounted a longitudinal staple track or bar 22 upon which sticks of the staples 11 are carried to be pushed forwardly by a pusher 23 suitably motivated forwardly in the magazine 21.

At the front end of the staple magazine 21, the foremost staples 11 are fed through a doorway aperture or slot 24 in a back-up plate 25 through which an upper forward extension of the staple carrying rail or bar 22 extends past lead-in bevels 26 on the rear vertical margins defining the slot 24 to support up to the next to the foremost of the staples 11 of the staple supply. The foremost staple is positioned for driving within a vertical driver blade guideway and fastener driveway channel or groove 27 in a front nose piece 28 which is of generally horizontal U-shape cross-section and has the inner forward vertical face thereof in abutment with the front face of the back-up plate 25 as best seen in Figure 2.

One of the problems encountered in driving staples resides in the tendency of the staple legs to tilt or cant rearwardly, and sometimes to spread apart or collapse toward one another, as an incident to the initial impact thereagainst of the driver blade 12 and detachment of the staple from the stick of staples. Herein this problem is overcome by the provision of improved guiding ramp means on the back-up plate 25 at the lower end of the doorway opening 24. To this end, a pair of spaced ramp grooves 29 and 29a (Figure 4) is provided under respectively opposite sides of the doorway slot 24 and aligned with the overhanging legs of the staples 11 fed through the doorway slot.

As best seen in Figures 1 and 4, the ramp grooves 29 and 29a slope downwardly and forwardly toward and lead into the driveway 27. Between the grooves and separating the same is a solid separating land portion 30. Through this arrangement, as each staple is driven, the tips of the legs thereof are guided positively by the ramps 29 and 29a down into the driveway without any danger of the tips of the legs finding any interference with the back-up plate 25. Since the ramps 29 and 29a are machined directly into the plate 25, or are cast therein where the plate is an investment casting or the like, there are no joints at the grooves 29 and 29a that might spread and catch the tips or points of the staples.

It will be observed that one of the ramp grooves, herein the ramp grove 29a is slightly deeper and longer than the remaining ramp groove 29. This is for the purpose of accommodating and compensating for the respective forwardly and rearwardly biased or chamfered points on the staple legs, so constructed for divergence on entering the work into which driven. Therefore if the ramps 29 and 29a were of the same depth, there might be a tendency for the staple to twist as it is being driven due to the rearwardly biased tip tending to skew forwardly and thus throw the staple out of balanced driving relation. By compensating for this difference in bias of the staple tips the staples are guided squarely into the driveway 27. Moreover, since the stock from which the staples are made is softer than the back-up plate 25, engagement of the staple leg tips with the ramps 29 and 29a during driving apparently tends to straighten any rearward bend or burr in the tips of the legs, and more particularly the tip of the rearwardly chamfered leg, so that the legs enter the driveway 27 free from interference with driving movement thereof into the work. While the ramp groove 29a is shown in the present instance as being located at the right-hand side of the doorway slot 24, that is at the left side of Figure 4, it will be appreciated, of course, that the location of the respective grooves may be reversed, depending upon which way the staple leg tips are slanted or biased.

The intermediate separating land 30 performs a useful function in resisting any tendency of the staple legs to collapse toward one another during initial impact of the driving blade. The outer side walls defining the ramp grooves 29 and 29a serve, of course, to retain the staple leg tips against spreading apart.

By preference, the nose piece 28 functions not only as a staple guideway and driver guide, but also as means for positively holding the lower forward end portions of the body plates 13 and 14 against spreading apart. The nose piece 28 also serves to absorb the shocks and jarring impacts that may be imposed on the head end portion 17 of the machine incident to driving of the staples. Accordingly, the nose piece or member 28 comprises a strong generally U-shaped body structure that has in addition to the front staple stop and guideway portion, side flange portions 28a that embrace the outer sides of the body plates and are slidably engageable therewith from the lower end of the machine upwardly. To disengage and remove the nose piece it is pulled or forced slidably downwardly out of position from the bottom of the machine. At its upper end portion the nose piece 28 has an upwardly facing shoulder formation 31 opposing overlying complementary front end portions of the body side plates, and more particularly of the head portions of the side plates. A drive-off recess or socket 32 opens upwardly in the upper face of the shoulder 31 and is accessible from the front of the machine through a forwardly opening recess 33 provided in the overlying front portions of the body plates so that a drive-off tool can be inserted through the opening 33 into the socket 32 for driving the nose piece 28 slidably downwardly off of the machine when desired.

For motivating the driving blade 12, an elongated driving plunger 34 is provided which may be of non-circular cross section, and preferably of rectangular cross section and is reciprocably vertically guided in a plunger guideway provided by the body plates in the head end portion 17 thereof, there being preferably a liner 37 within the guideway 35 and which liner may be of suitable material such as hardened steel or other metallic material or it may be a plastic material such as nylon that is highly resistant to abrasion and has certain self-lubricating properties. At its upper end the guiding plunger 34 has a knob or driving head 38 preferably of suitably rugged construction to permit stroking of the same with a mallet in service.

Normally the driving plunger 34 is urged into and maintained in a retracted position by biasing means such as a coiled compression spring 39. This spring is of substantial length and is accommodated within a downwardly opening bore 40 preferably disposed axially within the plunger and against the upper blind end of which the upper end of the spring thrusts. At its lower end the biasing spring 39 thrusts against an upwardly facing shoulder provided by a collar-like abutment member 41 which may be integrally formed at the lower end portion of a spring guide rod 42 that projects upwardly through the spring to a height where the upper end portion of the rod will normally be substantially up inside the lower end portion of the spring bore 40 within the plunger. At its lower extremity the rod 42 has a terminal boss or projection 43 that fits in assembly loosely within a centering aperture 44 in an integral rearwardly extending supporting base flange 45 provided on the upper end portion of the back-up plate 25. Through this arrangement, the upstanding rod 42 serves to guide the elongated compression spring 39 against buckling during compression thereof in the driving stroke of the plunger 34. Since the spring thrusts downwardly against the shoulder collar 41, the reaction of the spring thrust assures that the centering extremity projection 43 will not work out of the centering hole 44.

As least the upward limit of reciprocation of the driving plunger 34 on its return stroke is limited by a stop member 47 which is preferably in the form of a block mounted for fore and aft reciprocation within a chamber 48 that opens forwardly into the plunger guideway 35 and is operable within a vertically elongated groove 49 in the rear face of the plunger 34, at the lower end of which is an upwardly facing shoulder 50 engaged by the block 47. A bolt or pin 51 normally holds the block 47 in its stop position but upon removal of the pin the block 47 can be moved rearwardly to release the plunger 34 for withdrawal from the guideway 35.

At its upper end portion the driving blade 12 is constructed for interengagement with the plunger 34 and to this end is provided with a generally cruciform head portion 52 (Fig. 3) which is received within a complementary cruciform recess 53 in the forward face of the lower end portion of the driving plunger 34 and with the shank or blade portion of the driving blade projecting below the lower end of the plunger. In the assembly, the forward face of the driving blade 12 is arranged to lie in sliding face-to-face abutment with the liner 37 at the front of the plunger guideway 35. In its fully retracted position, the lower end portion of the driving blade 12 is backed up by the upper end portion of the back-up plate 25 and is received within the upper end portion of the staple driveway groove 27 in the inner face of the nose piece or plate 28 which for this purpose extends up to a position opposite the upper end portion of the back-up plate.

According to the present invention, the driving blade 12 is constructed to meet several important problems and conditions, namely, to afford substantially increased strength and resistance to buckling in its narrowest dimension or thickness, to avoid the development of damaging vibrations in the blade, and to enable the blade to be used in a standardized form and size for driving of staples of a substantial range of gauges. To this end the driving blade 12 is provided with a longitudinal reinforcing and vibration damping rib 54 which is preferably located on the front face of the blade and extends throughout the length of the shank of the blade from the upper head end portion 52 substantially to the lower end driving tip of the blade.

In a preferred form, the rib 54 may be of substantially one-third the width of the driving blade and projects from the face of the driving blade. It is desirable, of course, to have the thickness of the driving blade approximately the same as the thickness or gauge of the fasteners to be driven so as to effect a uniform driving thrust upon the heads of the fasteners and so as to be accommodated within the fastener driveway 27 incident to driving the fasteners therethrough and therefrom into the work.

In a highly practical form, the rib 54 on the driving blade is provided as a continuation of the full thickness of the original stock or blank of which the driving blade is made and to which thickness the driving blade head 52 conforms. Then, material is removed from the selected face of the driving blade shank, herein the front face, preferably equally along each longitudinal margin of such face, as by milling or grinding to define longitudinal rabbet grooves providing inset ledges or lateral wing portions 55 at the respectively opposite sides of the central longitudinal area of such face. This leaves the rib 54 projecting outwardly beyond the outwardly or forwardly facing surfaces defining the ledge or wing portions 55. The depth of the grooves, providing the ledges or wings 55, is controlled to leave the thickness of the driving blade 12 at each side of the rib 54 approximately equivalent to the gauge of the fasteners 11 to be driven. At its lower extremity the rib 54 is chamfered off as at 57 to merge into the gauge thickness of the blade tip so as to avoid making an oversize countersink hole where the driving stroke of the blade is adjusted for countersinking the head ends of the fasteners.

For accommodating the rib 54, the longitudinal base face of the driveway groove 27 is provided with a complementary rib guide or track groove or channel 58 within which the rib is slidable as a guide rail in the reciprocal strokes of the blade.

As a result of the rib structure 54, the shank portion of the driving blade is substantially reinforced and strengthened against any tendency to buckle. This is important in view of the substantial length of the shank and its thinness in the gauge thicknesses that it must accommodate. It has been found that blades equipped with the rib 54 may be as long as about 4⅞ inches and yet produce satisfactory exceptionally long life results even though the blade is not backed up throughout most of the length of the shank portion thereof in the retracted position of the blade.

Furthermore, driving shocks on the blade, which in conventional blades have caused breakage due to localization of vibration patterns, or harmonic concentrations, herein the longitudinal rib 54 effectively prevents by acting as an efficient vibration damper.

In addition, a standard thickness of driving blade, inclusive of the rib 54 is adaptable for a substantial range of gauges of fasteners. More particularly the shank of the driving blade can be readily adjusted to be received within the gauge dimensioned driveway 27 for any of a substantial range of gauges. Since the fasteners, such as the staples 11 must be supported front and back in the driveway 27 it will be appreciated that the driveway must be dimensioned to correspond to the gauge of the fastener with only the slight clearance necessary to avoid undue frictional resistance during driving of the fasteners. Herein accommodation of the driving blade to any of a substantial range of gauges is accomplished by the simple expedient of milling or grinding the depth of the grooves defining the ledges or side wings 55 to afford the desired gauge thickness in the driving blade at each side of the rib 54. Thus, where a maximum heavy gauge of staple is to be driven the thickness of the driving blade at each side of the rib 54 may be as indicated by way of example by the dot dash outline H in Fig. 2. On the other hand, where the blade must be accommodated to an extremely narrow gauge of fastener it may be ground or milled down at each side of the rib 54 as for example to the dash outline position as indicated at T in Fig. 2. Any incremental thickness between these extremes H and T may, of course, be afforded.

In Figs. 5 and 6 is shown a modification of the fastener driving machine adapting the same especially for use on work where the machine must be applied closely into a re-entrant corner between angularly joined pieces of the work or where angularly joined members must be connected. It will be appreciated that except for differences in the machine thus modified, and identified at 100, as compared to the machine 10 of Fig. 1, internal structure and arrangement may be substantially the same and accordingly similar reference numerals identify like parts. The fastener driving machine 100 is shown as having a body comprising cooperable complementary left and right side plates 101 and 102, respectively. The upper portion of the body is formed to provide a handle 103 over a hand hole 104 while the lower portion of the body provides a magazine for supporting and feeding forwardly a supply of fasteners to be driven from the extreme forward lower end portion of the machine. While such fasteners may be staples, for certain purposes such as for connecting a table top 105 and a moulding 107 together, nail or pin fasteners may be employed and driven from the machine. It will be observed that the moulding 107 has a flange 108 on its lower portion that is engageable within a groove 109 in the edge of the member 105 and it is this flange 108 that must be secured against withdrawal from the groove to hold the moulding in proper position to extend above the member 105, as shown.

To drive a pin or other fastener into the extreme margin of the member 105 and into the flange 108 requires that the front end or face of the nailing or driving machine fit closely within the corner defined between the top of the member 105 and the upwardly projecting portion of the moulding member 107. To accomplish this, the driver blade of the machine must be located as close to the front end face of the machine as practicable. Herein, for this purpose, front end vertical thickened portions 110 on the body plates 101 and 102 have the plunger guideway 35 in the extreme forward end portions thereof between the cover plates and opening forwardly from the machine so that the driving plunger 34 with the lines 37 is mounted with the outer of forward flanges of the liners facing substantially flush with the front edges of the body plates of the machine. The liner 37 is made up of a pair of channel or U-shaped liner plate members fitting within the opposing channels or grooves in the plates 101 and 102 comprising the plunger guideway 35.

For retaining the driving plunger 34, the liners 37 and the driving blade within the guideway 35, the front end of the machine body 100 is provided with an angular, vertically elongated, transversely or horizontally U-shaped retainer and plunger guide plate or bracket member 111 constructed to fit snugly on the front end face of the body and with respective preferably identical side wing flanges 112 embracing the sides of the thickened body portions 110. The front panel of the retainer 111 is preferably of a length to extend from adjacent to the top 82 of the machine to an upstanding portion 60 of the transversely U-shaped nose piece 28, the front portion of which nose piece is shortened to be flush with the outer surface of the retaining panel or flange of the member 111.

Attachment of the retainer member 111 is effected as by means of a pair of bolts 113 secured through the upper and lower portions of the side flanges 112 and the thickened body portion 110 behind the plunger guideway 72. To afford clearance for a head 91 on the retainer pin 51, the side flanges 112 are preferably recessed as shown at 114 so that, in effect, the securing bolts 113 extend through rearward ear-like projections of the flanges 112 respectively above and below the clearance recesses 114.

As a result of the construction thus attained in the machine 100, the front end of the machine can fit into a corner of the work to drive a fastener as close to the juncture of the parts of the work within the corner as permitted by the thickness of the front of the nose piece 28 and the retaining and guide plate bracket member 111 necessary to serve as retainers and guides for the front side of the liner 37, the plunger 34 and the driving blade. In addition, the side flanges 112 of the retaining bracket member 111 cooperate with the sides of the nose piece 28 for retaining the side plates of the body against spreading apart, thus substantially reinforcing the forward end portion of the machine.

While the plunger return spring 39 may be a simple wire coiled compression spring as shown in Figure 6, a highly desirable, more reliable, better performing and much longer lasting form of the spring is shown in Figures 1, 3 and 7. In this improved form the spring 39 comprises a plurality of spring wires embracingly wound upon one another, somewhat like a stranded rope. The plurality of wires are unequal in number so that there is a central or core wire 39a about which is tightly wound a plurality of additional wires 39b in helical fashion. Thus, the central or core wire 39a is helically looped and the outer embracing wires 39b are helically wound about the helically looped core wire and conform to the helical loops of the core wire. The weight, length and performance characteristics required will determine the number of helically wound outer wires 39b that will be used. For example, there may be three, five or seven or more of the externally wound wires 39b, seven being shown in Fig. 7.

Practical results of the helically wound multistrand form of the return spring 39 have been extremely high resistance to taking a set or breakage under high velocity impacted usage in the fastener driving machines, whether adapted for mallet operation as is the machine in Figures 1 and 5, or fluid pressure operation. In a comparative test a multi-strand helically wound spring as shown in Figure 7 withstood about 100,000 compression and return strokes as against about 8,000 strokes for a comparable one strand spring. In addition it has been found that longer springs can be successfully used, thus facilitating longer travel of the driver plunger for longer fasteners.

Apparently the several strands of the multi-strand spring mutually compensate for any individual strand weaknesses. More importantly, however, it appears that each of the individual wires in the wound multi-wire spring differs in its harmonic or resonance characteristic which in the aggregate in the multi-strand spring are mutually damped without reaching a zero point of vibration, thereby avoiding any fatiguing vibrational frequency within the range of fastener driving machine operation.

It will be understood that modifications and variations may be effected without departing frm the scope of the novel concepts of the present invention.

I claim as my invention:

1. In a fastener driving machine having a pair of body plates joined in face-to-face relation and defining therebetween chambers for accommodating fastener supply means and fastener driving means cooperative therewith, a nose piece member of substantially U-shape for snugly embracing the lower forward portions of the body plates, said nose piece having an upper forwardly projecting portion affording an upwardly facing shoulder, and the body plates having a forward cooperative portion thereof against which said shoulder abuts supportingly, said body plate forward abutting portion having adjacent to said nose piece shoulder an access opening for exposing a portion of said shoulder for engagement by a drive-off tool, said shoulder having a recess therein exposed at said access opening for engagement therein of the tool.

2. In a staple driving machine including means for supplying staples forwardly, means for driving staples at the forward portion of the machine, said staple driving means including a reciprocable driving blade and means for guiding the driving blade and providing a staple driveway into which the staples are fed, and a member providing the rear portion of the staple driveway, said member including a part thereof for underlying the next to foremost staple relative to said driveway, said part having a pair of spaced apart downwardly and forwardly directed oblique staple leg guiding ramp grooves or channels leading into said driveway and separated by a solid land portion affording respective shoulders facing into said ramp grooves or channels.

3. In a staple driving machine including means for supplying staples forwardly, means for driving staples at the forward portion of the machine, said staple driving means including a reciprocable driving blade and means for guiding the driving blade and providing a staple driveway into which the staples are fed, and a member providing the rear portion of the staple driveway, said member including a part thereof for underlying the foremost staples to said driveway, said part having a pair of spaced apart downwardly and forwardly directed oblique staple leg guiding ramp grooves or channels leading into said driveway and separated by a solid land portion affording respective shoulders facing into said ramp grooves or channels, said ramp grooves or channels being of differential depth and length so as to accommodate respectively forwardly and rearwardly chamfered staple leg tip portions.

4. In a staple driving machine including a body structure having means for supplying staples forwardly, means supported by the forward portion of the body above the staple supplying means for driving staples successively from the staple supply, said staple driving means including a reciprocable driving blade, a plate member carried by the body structure and providing a vertical doorway therethrough for delivery of staples therethrough into position under the driving blade and serving as a rear guide for the driving blade, a front member carried by the body structure and providing with the back plate a staple driveway and guide for the driving blade with a substantial length lower portion of the forward member and a corresponding lower portion of the back plate extending below said doorway and defining the lower portion of the staple driveway, said lower portion of the back plate having a pair of spaced apart downwardly and forwardly directed oblique staple leg guiding ramp grooves or channels leading from said doorway into said driveway and respectively receptive of respective legs of staples driven down through said driveway by said driving blade whereby to guide the staple legs into the lower portion of the driveway.

5. In a fastener driving machine, a body structure having a forward upwardly projecting end portion provided with a vertical plunger guideway, liner structure mounted in said guideway, a plunger slidably reciprocable in said liner and having a driving blade projecting downwardly beyond said plunger guideway, a back plate member carried by the body structure below the forward portion of said plunger guideway and having an upper rearwardly projecting and upwardly facing flange underlying said plunger guideway and providing an upwardly facing abutment for the overlying portion of the plunger guideway liner, and a nose member carried by the lower portion of the body structure and providing a portion in front of the back plate affording with the back plate a driving blade guideway and fastener driveway, said nose member having an upwardly facing surface serving as an abutment for the forward portion of the liner.

6. In a fastener driving machine, a pair of complementary cooperatively opposed vertically standing body plates each of a thickness to provide about half the thickness of a body for the machine and disposed in face-to-face abutment, said body plates in the lower portions thereof defining therein and therebetween a fastener supply magazine and in the forward portions of the plates provided with a driving assembly support above the supply magazine, said driving assembly support comprising complementary vertical forwardly opening grooves in the body plates defining a vertical guideway opening from the front margins of the body plates, a driving plunger and blade structure reciprocably supported in said grooves, means at the lower ends of said groove guideway receptive of successive fasteners and providing a fastener driveway within which said blade is operable to drive fasteners in the reciprocations of the plunger, a closure plate member of U-shape cross-section having a front wall closingly engageable with the forward edges of said body plates and providing a thin front driving plunger retaining wall for said guideway, side wall flanges on said closure plate embracing the outer sides of the body plates and extending rearwardly along said outer sides a substantial distance beyond said guideway and serving to maintain the forward portions of the body plates against spreading apart from said face-to-face abutment, and securing bolts extending through the distal marginal portions of said side wall flanges of said closure plate and through said body plates rearwardly from said guideway grooves and thereby securing the closure plate in position and also coacting with said side wall flanges in securing the body plates together against spreading apart.

References Cited in the file of this patent

UNITED STATES PATENTS

| | | |
|---|---|---|
| 1,895,457 | Goddu | Jan. 31, 1933 |
| 1,943,661 | Ellacott | Jan. 16, 1934 |
| 2,073,958 | Crosby | Mar. 16, 1937 |
| 2,087,779 | Pankonin | July 30, 1937 |
| 2,097,051 | Stock | Oct. 26, 1937 |
| 2,143,384 | Peterson | Jan. 10, 1939 |
| 2,237,438 | James | Apr. 8, 1941 |
| 2,341,530 | Crosby | Feb. 15, 1944 |
| 2,409,049 | Lang | Oct. 8, 1946 |
| 2,472,032 | Wandel | May 31, 1949 |
| 2,545,372 | Morberg | Mar. 13, 1951 |